United States Patent [19]

Ikeda et al.

[11] 4,036,993
[45] July 19, 1977

[54] PROCESS FOR PREPARATION OF FISH MEAT EXTRACTS

[75] Inventors: Izumi Ikeda; Takashi Takasaki, both of Karatsu, Japan

[73] Assignee: Tensei Suisan Company, Limited, Karatsu, Japan

[21] Appl. No.: 677,696

[22] Filed: Apr. 16, 1976

[30] Foreign Application Priority Data

Apr. 25, 1975 Japan .................................. 50-49597

[51] Int. Cl.$^2$ ............................................. A23L 1/325
[52] U.S. Cl. ...................................... 426/7; 426/655; 195/29; 260/112 R
[58] Field of Search .............. 426/7, 643, 657; 195/4, 195/13, 29; 260/112 R

[56] References Cited

U.S. PATENT DOCUMENTS

| 2,806,790 | 9/1957 | Bedford | 426/7 |
| 3,170,794 | 2/1965 | Jeffreys et al. | 426/7 |
| 3,697,285 | 10/1972 | Faith, Jr. et al. | 426/657 X |
| 3,857,966 | 12/1974 | Feldman et al. | 426/7 |

Primary Examiner—Raymond N. Jones
Assistant Examiner—R. A. Yoncoskie
Attorney, Agent, or Firm—Richard J. Holton

[57] ABSTRACT

A fish extract having a high nutritive value and being free of fish smell and bitterness is advantageously obtained when fish bodies are directly charged in a reaction vessel without subjecting them to the conventional cutting and slurrying treatments and are treated with two kinds of proteinases at different pH values of 9 to 10 and of 5 to 6 at 50° to 60° C.

5 Claims, No Drawings

PROCESS FOR PREPARATION OF FISH MEAT EXTRACTS

BACKGROUND OF THE INVENTION

1. Field of the Invention

This invention relates to a process for preparing liquefied proteins having a high nutritive value and being free of fish smell and bitterness from bodies of fishes captured in large quantities such as a saurel, sardine, mackerel pike, walleye pollack, Atka mackerel and krill. More specifically, the invention relates to a process for the production of fish meat extracts which comprises charging large quantities of fish bodies directly in a reaction vessel without conducting a pretreatment of finely cutting them mechanically, and liquefying them with proteinases twice at a pH of 9.0 to 10.0 and at a pH of 5.0 to 6.0, to thereby obtain liquefied proteins having a high nutritive value (such as proteose, polypeptide and peptide), low temperature-treated fish oils of a low acid value and bone dust meals.

2. Description of the Prior Art

According to the conventional process for the preparation of liquefied proteins (fish meat extracts), liquefied proteins are generally prepared by removing the internals from starting fishes, conducting a pretreatment (primary treatment) of cutting and grinding heads, bones, muscles and the like by a cutter, a meat grinder or the like to form a slurry, which requires great labor power, and decomposing and liquefying the slurry with a proteinase at a pH approximating 7.0 (under neutral conditions). In this conventional process, during the cutting step, autolysis enzymes in fish bodies are activated to promote oxidation and hydrolysis on contact with ambient air, and the decomposition is further accelerated by a proteinase added to the fish meat slurry, whereby proteins are converted to free amino acids of a bitter taste and fats are decomposed to low-molecular-weight fatty acids having a strong smell. Accordingly, the so obtained liquid layer portion is not edible at all because of a putrid smell and a strong bitterness. Further, the above-mentioned cutting or grinding pre-treatment requires great labor power.

SUMMARY OF THE INVENTION

It is therefore a primary object of this invention to provide a process for preparing liquefied proteins having a high nutritive value and being free of smell and bitterness from fishes captured in large quantities, in which the above-mentioned labor-requiring pre-treatment can be omitted. Another object of this invention is to provide a process for preparing liquefied proteins from fishes captured in large quantities, according to which liquefied proteins (fish meat extracts) having a high nutritive value and a good taste without a smell or bitterness can easily be recovered at high efficiencies.

In accordance with this invention, there is provided a process for preparing fish meat extracts which comprises charging bodies of a popular fish captured in a large quantity into a reaction vessel directly without subjecting them to a cutting and slurrying pre-treatment and liquefying fish meat proteins by using two kinds of proteinases at different pH values of 9 to 10 and of 5 to 6 at a temperature of 50° to 60° C.

DETAILED DESCRIPTION OF THE PRESENTLY PREFERRED EMBODIMENTS

In this invention, bodies of a popular fish captured in a large quantity, such as saurel, mackerel, sardine, mackerel pike, walleye pollack, Atka mackerel and krill, are charged with water in a reaction vessel directly without a cutting and slurrying pre-treatment. The amount of water and the amount of fish bodies charged are preferably approximately equal. Larger or smaller proportions of water may be used, but excessive amounts of water require larger amounts of proteinase enzyme, and produce a diluted product which takes excessive time and energy to concentrate, while if the water is much less in weight than the weight of the fish bodies, it becomes difficult to separate the extract. Salt water, such as sea water, may in principle be used, but it tends to affect the taste and pH of the extract, and it is preferred to use fresh water to form the reaction mixture. Then, the temperature is elevated to at least 60° C. to deactivate autolysis enzymes contained in the fish bodies, and at a temperature maintained at 50° to 60° C. a commercially available proteinase is added to the fish bodies while controlling the pH within a range of 9.0 to 10.0. Control of the pH may be accomplished in any convenient manner, bearing the mind that the object is to produce a nutritious food substance complying with applicable laws and regulations. Thus, while adjustment of pH to an alkaline value may be accomplished by addition, for example, of aqueous ammonia, such addition would adversely affect the food properties of the product, and it is therefore preferred to use mild, edible alkalizing agents such as sodium carbonate and sodium bicarbonate. In this state, the fish bodies are agitated for about 1 hour to effect reaction, whereby muscles are swollen, body portions are ground and the fish bodies can easily be separated into a muscle portion and a bone portion. By this reaction, the enzyme permeates sufficiently in the meat protein texture and liquefaction of proteins is performed promptly, so that proteins are decomposed to the stage of proteoses. Under these temperature and pH conditions (50° to 60° C. and a pH of 9 to 10) bacteria adhering on surfaces of fish bodies (non-spore-bearing bacteria) are sterilized, and since no decomposition is performed by these bacteria, purtrefaction phenomena such as formation of amino acids giving a bitter tase are prevented. Substantially any of the commercially available alkaline proteinases may be used for this step. Acidic proteinases are not preferred, as they lack the ability to enhance the sterilizing and deodorizing effect of this step as do the alkaline proteinases. A particularly useful alkaline proteinase for use in this step is a fish-soluble enzyme manufactured in Japan by Kinki Yakuruto Maufacturing Co., Ltd. and sold through Yakuruto Biochemistry Co., Ltd. as sales agent, under the trademark "AROAZE", and this is the enzyme used in the Examples.

Then, the pH is changed to 5.0 to 6.0 and an acid-resistant proteinase is added to the treated fish body slurry in which the proteoses and fats are linked to each other in the emulsified state, whereby the proteoses are decomposed to the stage of peptides and the slurry is separated in a liquefied protein layer and a layer of fats having a fish smell. For this low-pH treatment step, substantially any commercially available acid-resistant proteinase may be used. A particularly useful one is manufactured in Japan by Kinki Yakuruto Manufacturing Co., Ltd. and sold through Yakuruto Biochemistry Co., Ltd. as sales agent, under the trademark "PUNCHDAZE NP-2".

For control of pH during the low-pH treatment, substantially any convenient acid or acid-reacting compound may be used, having due regard to the object of the invention and to applicable laws and regulations, Edible (or potable) acids such as malic acid, citric acid, acetic acid, etc., should be used at least for the final adjustment, although neutralization to approximately pH 7.0 may be accomplished by the use of less expensive mineral acids such as hydrochloric acid or sulfuric acid, if so desired.

Then, the temperature is elevated to about 90° C. to deactivate the enzymes and stop the decomposition reaction.

The resulting reaction liquid is separated into a fish oil portion, an aqueous solution layer and a solid portion of bones and scales by a centrifugal three-layer separator or the like. The solid portion of bones and scales are dried according to a customary method to form a bone dust meal. The fish oil is washed with water and stored. the aqueous solution layer, namely the liquefied protein extract, is filtered by a press filter, and in order to avoid thermal denaturation, the resulting clear and transparent liquid is subjected to vacuum concentration at a temperature not exceeding 70° C. to obtain a fish meat extract having a water content not higher than 50%, especially about 30%. The vacuum distillation is carried out in conventional manner, at a temperature not exceeding 70° C., and preferably at 50° to 60° C. or less. The pressure employed for the vacuum distillation is generally proportional to the temperature (i.e. lower absolute pressures permit distillation at desirably lower temperatures), as will be well understood by those skilled in the art.

If the starting fish bodies are boiled prior to charging into the reaction vessel, the yield of the fish meat extract can be increased.

While the process has been described with reference to the use of fish bodies as the starting material, it is to be understood that it is not essential that the fish bodies be used entire; in some cases it may be advantageous to subject to the bodies to minor pretreatment such as removal of tails, fins, entrails, etc., or large fish may be cut into chunks for convenience of handling. The term "fish bodies" it therefore intended to contemplate fish bodies which have been so treated. On the other hand, it is to be emphasized that such treatment is not essential to the success of the process, and in fact one of the chief advantages of the process is that preliminary comminution and slurrying of the fish meat, with accompanying input of work and development of smell and bitterness are not necessary.

This invention will now be illustrated in detail by reference to the following Examples that by no means limit the scope of this invention.

EXAMPLE 1

Five tons of mackerel were charged together with the same amount of water without any pre-treatment in a reaction vessel equipped with a stirrer, in which the temperature could be elevated. Then, the temperature was elevated to a level higher than 60° C. and this temperature was maintained for 15 minutes. Then, the temperature was lowered to about 60° C. and the pH was adjusted to about 9. A commercially available proteinase was added to the mixture and reaction was conducted under the above temperature and pH conditions for about 1 hour. Then, the pH was lowered to 5 to 6 and a commercially available acid-resistant proteinase was added to the reaction mixture. Under these pH and temperature conditions, reaction was conducted for about 1 hour, whereby the reaction mixture was separated into a layer of bones and scales, an oil layer and an extract layer. The phase-separated mixture was separated into respective layers by a customary three-layer separator or the like. The layer of bones and scales was dried according to the customary method to obtain a bone dust meal. The oil layer was processed into a fish oil according to a customary method. The extract layer was filtered and subjected to reduced pressure distillation to obtain a fish meat extract having a water content lower than 50%

Yields of these products varied to some extend depending on the kind of the starting fish, but in general, the yield of the fish oil was 5 to 10%, the yield of the bone dust meal was 10 to 15%, and the yield of the fish meat extract was about 17%.

Results of the analysis of a mackerel extract obtained according to the method of the above Example 1 are as shown in Table 1. For comparison, data obtained with respect to a mackerel extract prepared according to the conventional method described in the text of the specification are also shown in Table 1.

TABLE 1

| Item | Product of This Invention | Product of Conventional Method |
| --- | --- | --- |
| Water content | 26.85% | 38.05% |
| Protein content | 50.43% | 54.38% |
| Fat content | 0.17% | 0.12% |
| Fiber content | 0 % | 0 % |
| Ash content | 12.30% | 6.27% |
| Sugar content | 10.25% | 1.18% |
| Monosodium glutamate | 0.94% | 0.59% |
| Inosinic acid | 0.23% | 0.49% |
| Calorific value | 244 calories | 223 calories |

As is apparent from the above results, the content of monosodium glutamate, which has a very close relation to the taste of the product, was much higher in the product of this invention than in the product of the conventional method.

EXAMPLE 2

Five tons of krill captured in the Antarctic Ocean was charged together with the same amount of water into a reaction vessel equipped with an agitator, in which the temperature could be elevated. The temperature was elevated to a level higher than 60° C. and this elevated temperature was maintained for 15 minutes. Then, the temperature and pH were adjusted to 50° to 60° C. and 9 to 10, respectively. A commercially available proteinase was added and reaction was conducted for about 1 hour, and the pH was lowered to 5 to 6 and a commercially acid-resistant proteinase was added. Reaction was further conducted for about 1 hour, whereby the liquid mixture was separated into an oil layer, an extract layer and an undecomposed shell layer, each of which was recovered by a three-layer separator or the like according to a customary method. The undecomposed sheel layer was dried according to a customary method to form a dust meal, and the oil layer was processed into an oil according to a customary method. The extract layer was filtered and subjected to reduced pressure distillation to obtain a krill extract having a water content lower than 50%. The yield of the dust meal was about 10%, the yield of the oil was about 5%, and the yield of the extract was about 30%.

When the above procedures were repeated after the starting krill had been boiled and dried, the yield of the oil was about 5%, and the yield of the extract was 90 to 100%.

In the foregoing Examples, each value of the yield was percent by weight based on the starting material (inclusive of water contained in the fish bodies, but not inclusive of the amount of water mixed with the starting fish bodies to form the reaction mixture).

As will be apparent from the foregoing description, a particularly advantageous feature of the present invention, as compared to the processes of the prior art, lies in the fact that whereas the conventional art uses an autolysis enzyme together with an added enzyme agent, the present invention involves elevating the temperature of the fish to at least 60° C., which deactivates the autolysis enzyme, and the fish is decomposed solely by the action of the added enzyme agent, so as to extract protein proper for consumption as food.

While this invention has been described with reference to certain preferred embodiments and illustrated by way of specific examples, these are illustrative only, and the invention is not to be construed as limited, except as set forth in the appended claims.

What is claimed is:

1. A process for preparing fish meat extracts which comprises the steps of forming an aqueous mixture of uncomminuted fish bodies and water, maintaining said aqueous mixture at elevated temperature between about 50° and 60° C. and a pH between 9 and 10, adding to the heated mixture a first proteinase, said first proteinase being stable in alkaline media, maintaining said mixture with said proteinase at said elevated temperature, for a sufficient period of time to effect a first enzymatic reaction wherein proteins are decomposed to the stage or proteoses, adjusting the pH of the reaction mixture from said first enzymatic reaction to between about 5 and about 6, adding thereto a second proteinase, said second proteinase being stable in acidic media, maintaining the resulting mixture containing said second proteinase admixed therewith at elevated temperature between about 50° and about 60° C., for a sufficient period of time to effect a second enzymatic reaction, heating the products of said second enzymatic reaction to about 90° C. to deactivate said proteinases, separating said products into a plurality of layers including an aqueous fish meat extract layer, and recovering said aqueous fish meat extract layer.

2. A process according to claim 1, further comprising the step of deactivating autolysis enzymes contained in the fish by elevating the temperature to a level higher than 60° C. prior to addition of said first proteinase.

3. A process according to claim 1 wherein the starting fish bodies are those of a fish selected from saurel, mackerel, sardine, mackerel pike, walleye pollack, Atka mackerel and krill.

4. A process according to claim 1 wherein the starting fish bodies are boiled prior to forming the aqueous mixture with water.

5. A process for preparing fish extracts which comprises the steps of forming an aqueous mixture of uncomminuted fish bodies and water, deactivating autolysis enzymes contained in said fish bodies by elevating the temperature of said aqueous mixture to a level higher than about 60° C., adjusting the pH of said aqueous mixture to between 9.0 and 10.0, adjusting the temperature of said aqueous mixture to between 50° and 60° C., adding thereto an alkali-resistant proteinase, thereby forming a first reaction mixture stirring said first reaction mixture while maintaining said first reaction mixture under said temperature and pH conditions for a sufficient period of time to effect a first enzymatic reaction wherein proteins are decomposed to the stage of proteoses, lowering the pH to between 5.0 to 6.0, further advancing the decomposition reaction by adding an acid-resistant proteinase to the reaction mixture from said first enzymatic reaction thereby forming a second reaction mixture, maintaining said second reaction mixture at a temperature between about 50° and about 60° C. and a pH between about 5.0 and about 6.0 for a sufficient period of time to effect a second enzymatic reaction, heating the products of said second enzymatic reaction to about 90° C. to deactivate said proteinases, separating said products into a fish oil layer, an aqueous layer of fish meat extract and a solid layer of bones and scales, recovering said fish meat extract layer and reducing the water content of said recovered fish meat extract layer to less than about 50 percent by subjecting the same to reduced pressure distillation.

* * * * *